(12) United States Patent
Jalabert

(10) Patent No.: US 11,095,188 B2
(45) Date of Patent: Aug. 17, 2021

(54) HOLLOW ROTOR SHAFT FOR ROTATING ELECTRICAL MACHINE, ASSOCIATED ROTOR AND METHOD

(71) Applicant: GE Energy Power Conversion Technology Limited, Warwickshire (GB)

(72) Inventor: Sylvain Jalabert, Grand-Est (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 91 days.

(21) Appl. No.: 16/351,761

(22) Filed: Mar. 13, 2019

(65) Prior Publication Data

US 2019/0288578 A1 Sep. 19, 2019

(30) Foreign Application Priority Data

Mar. 13, 2018 (FR) ...................................... 1852140

(51) Int. Cl.
| | |
|---|---|
| *H02K 7/00* | (2006.01) |
| *H02K 19/38* | (2006.01) |
| *F16C 3/02* | (2006.01) |
| *H02K 11/042* | (2016.01) |

(52) U.S. Cl.
CPC ............ *H02K 7/003* (2013.01); *F16C 3/023* (2013.01); *F16C 2380/26* (2013.01); *H02K 11/042* (2013.01); *H02K 19/38* (2013.01)

(58) Field of Classification Search
CPC ...... H02K 7/003; H02K 11/042; H02K 19/38; F16C 3/00; F16C 3/02; F16C 2380/26; F16C 3/023

USPC ....................................................... 310/75 D
See application file for complete search history.

(56) References Cited

U.S. PATENT DOCUMENTS

| | | | |
|---|---|---|---|
| 3,359,438 A | 12/1967 | Hylen | |
| 3,501,659 A * | 3/1970 | Pannell | ................ H02K 11/042 |
| | | | 310/68 R |
| 4,155,019 A * | 5/1979 | Weghaupt | .............. H02K 19/38 |
| | | | 310/61 |
| 4,203,044 A * | 5/1980 | Linscott, Jr. | .............. F16C 3/00 |
| | | | 310/61 |
| 4,388,544 A * | 6/1983 | Gillet | ..................... H02K 13/02 |
| | | | 310/71 |
| 6,448,674 B1 * | 9/2002 | Schierling | ............... F02N 11/04 |
| | | | 310/112 |

(Continued)

FOREIGN PATENT DOCUMENTS

| | | | | |
|---|---|---|---|---|
| CN | 203488533 | * | 3/2014 | ................ F16C 3/02 |
| WO | WO-2018036760 A1 | * | 3/2018 | ............... H02K 1/32 |

OTHER PUBLICATIONS

Bai et al., Machine Translation of CN203488533, Mar. 2014 (Year: 2014).*

(Continued)

*Primary Examiner* — Quyen P Leung
*Assistant Examiner* — Eric Johnson
(74) *Attorney, Agent, or Firm* — Wood IP LLC

(57) ABSTRACT

The hollow rotor shaft for a rotating electrical machine includes two parts. A first part includes a first hollow cylindrical element and a second part includes a second hollow cylindrical element, whereby sections of a first end of the first and second elements are in contact and secured by securing means.

10 Claims, 6 Drawing Sheets

(56) References Cited

U.S. PATENT DOCUMENTS

| | | |
|---|---|---|
| 2003/0228188 A1 | 12/2003 | White et al. |
| 2009/0233721 A1 | 9/2009 | Saenz de Ugarte |
| 2011/0135511 A1 | 6/2011 | Philippart |
| 2015/0123403 A1* | 5/2015 | Casazza ................. F03D 17/00 |
| | | 290/44 |
| 2019/0181736 A1* | 6/2019 | Frohlich ................. H02K 1/16 |

OTHER PUBLICATIONS

French Written Opinion dated Jan. 11, 2019 which was issued in connection with FR1852140 which was filed on Mar. 13, 2018.

* cited by examiner

HOLLOW ROTOR SHAFT FOR ROTATING ELECTRICAL MACHINE, ASSOCIATED ROTOR AND METHOD

TECHNICAL FIELD

This invention relates to a shaft for a rotating electrical machine. This invention also relates to a rotor for a rotating electrical machine comprising such a shaft and a method for producing such a shaft.

BACKGROUND OF THE DISCLOSURE

A rotating electric machine for example without a brush, known as a brushless motor, comprises a stator in which is inserted a rotor, and can weigh several hundred kilograms.

The rotor of such a machine may comprise a winding and diode bridges.

FIG. 1 shows an exemplary rotor 1 known from the prior art comprising an axis (A) of revolution.

The rotor 1 comprises a solid shaft 2 extending along the axis (A) and comprising two zones Z1 and Z2 and threads 6.

Zone Z1 comprises rotor windings 3 wound on the shaft 2 and zone Z2 comprises diode plates 4 fixed by screws 5 screwed into the threads 6.

The obtaining of the rotor 1 comprises winding operations of the windings 3 on the shaft 2, impregnation of the windings with an insulator, polymerization of the insulator and fixation of the diode plates 4 by means of the screws 5.

The operations of threading, winding and fixing the diode plates are performed by manipulating the entire shaft 2.

As a rotor shaft can, for example, weigh several hundred kilograms, the operations described can be complex to implement.

In addition, this weight influences the dynamics of the rotor by increasing its inertia.

The electrical and mechanical characteristics of the rotating electrical machine in which this rotor is mounted, in particular the torque generated at the output of the shaft 2, depend on the surface of the windings 3 distributed over the shaft. Therefore, for each modification of the electrical and mechanical characteristics, it is necessary to make a new shaft.

In other words, it is necessary to perform threading and winding operations on the shaft 2. No pre-assembly is possible.

One method of reducing the weight of the rotor shaft is to ream a portion of the interior of the shaft.

FIG. 2 shows a partially hollow rotor shaft 7 comprising two zones Z3 and Z4. Zone Z3 is intended to accommodate rotor windings and zone Z4 comprises threads 9 intended to accommodate screws for fixing the diode plates. Material 8 has been removed from the shaft in zone Z4.

However, this method complicates the production of the shaft 2.

Indeed, additional machining operations are necessary and are likely to degrade the interior of the shaft.

It is therefore proposed to overcome the disadvantages associated with conventional methods of manufacturing a rotor for a brushless rotating electrical machine.

BRIEF SUMMARY

In view of the above, it is proposed to use a hollow rotor shaft for a rotating electrical machine comprising two parts.

A first part comprises a first hollow cylindrical element and a second part comprises a second hollow cylindrical element, whereby sections of a first end of the first and second elements are in contact and secured by securing means.

According to another characteristic, the securing means comprise bosses regularly distributed over an internal periphery of the first end of the second hollow cylindrical element forming a second ring of bosses, each boss comprising a thread, said means comprising a fixation part and threaded elements each passing through a different thread and cooperating with the fixation part such that each threaded element is parallel to an axis of revolution of the shaft and hold the two sections and the bosses of the first and second hollow cylindrical elements in contact.

According to another embodiment, the shaft further comprises guiding means configured such that the hollow cylindrical elements fit together.

The guiding means comprise a smooth open crown comprising a section merged with the first section of the first hollow cylindrical element followed by a first shoulder and a ring of bosses comprising a free section followed by a second shoulder merged with the first section of the second hollow cylindrical element, an internal diameter of the smooth ring, an external diameter of the ring of bosses and the first and second shoulders being configured such that the internal surface of the smooth ring is in contact with the internal surface of the ring of bosses and the surface of a first shoulder and the surface of a second shoulder are in contact with each other.

According to another characteristic, the first hollow cylindrical element comprises a hollow tube intended to accommodate rotor windings on its external perimeter.

According to yet another characteristic, the second hollow cylindrical element comprises a hollow tube comprising perforated holes, through holes and a fixation part configured to accommodate fixation means configured to hold the diode plates on the second hollow cylindrical element.

According to another aspect, a rotor is proposed for a rotating electrical machine comprising a hollow rotor shaft according to one of the preceding claims.

According to yet another aspect, a method is provided for obtaining a hollow rotor shaft for a rotating electrical machine comprising two parts, each part comprising a hollow cylindrical element.

The sections of the first end of each of the hollow cylindrical elements are brought into contact and the two elements are secured to each another.

The internal surface of a smooth ring incorporated into the first end of a first cylindrical hollow element is brought into contact with the internal surface of a ring of bosses incorporated into the first end of a second cylindrical hollow element and the surface of a first shoulder is brought into contact with the surface of a second shoulder.

According to another characteristic, a first hollow cylindrical element is incorporated that comprises a smooth ring configured to accommodate a closing piece and smooth guiding holes configured to guide threaded elements with a second hollow cylindrical element comprising a ring of bosses comprising threads configured to cooperate with the threaded elements by inserting the threaded elements each passing through a different thread and a smooth guide hole such that each threaded element is parallel to an axis of revolution of the shaft and hold the first two sections of the first and second hollow cylindrical elements in contact with each other.

BRIEF DESCRIPTION OF THE DRAWINGS

Other characteristics of the invention will become apparent on reading the following description of the embodiments of the invention, given solely by way of nonlimiting examples, with reference to the drawings, in which.

DETAILED DESCRIPTION

Figure 1:
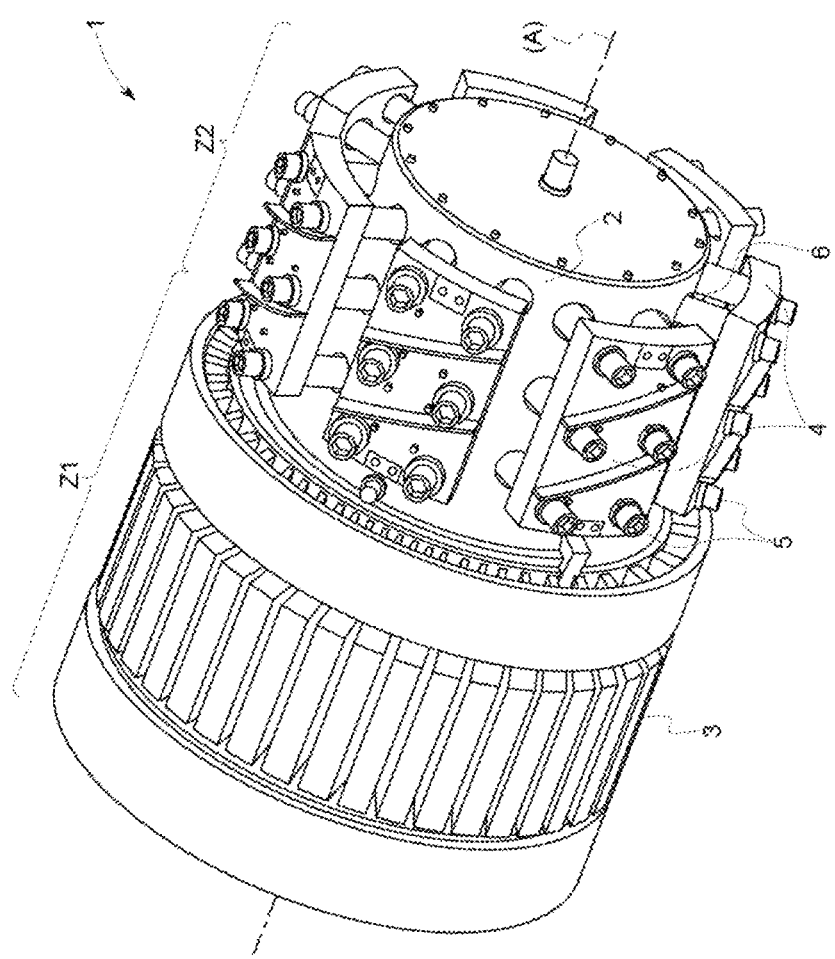
FIG. 1, as has already been mentioned, shows an exciter rotor for a rotating electrical machine according to the prior art.
Figure 2:
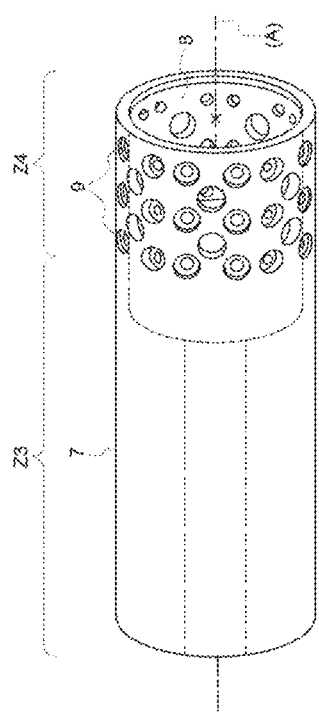
FIG. 2 shows a partially hollow rotor shaft according to the prior art.
Figure 3:
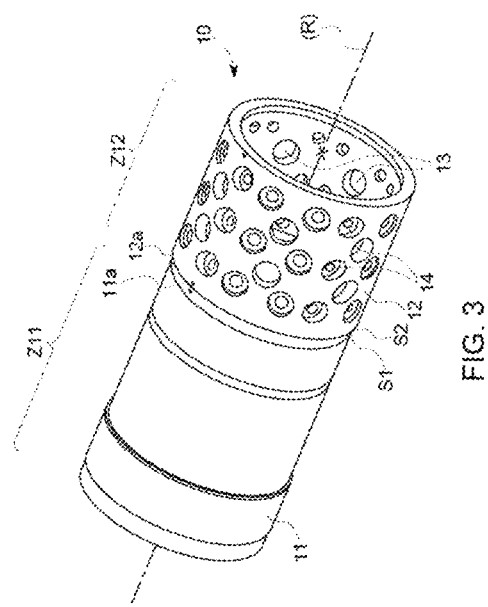
FIGS. 3 and 4 show an embodiment of a rotor shaft comprising first and second hollow cylindrical elements.
Figure 4:
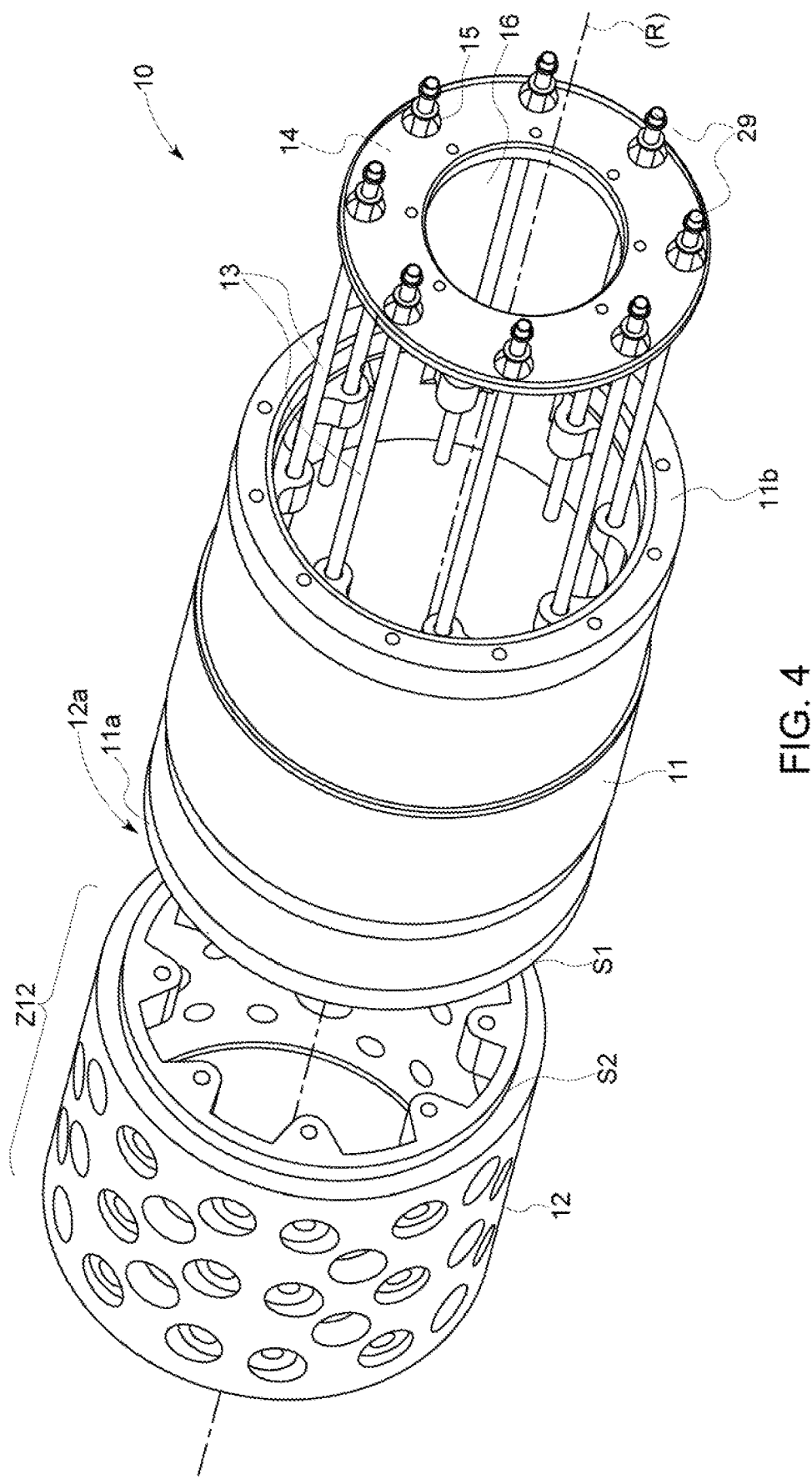

FIGS. 3 and 4 show an embodiment of a hollow rotor shaft for a brushless rotating electrical machine comprising an axis of revolution (R).

The shaft 10 comprises a first part Z11 comprising a first hollow cylindrical element 11 and a second part Z12 comprising a second hollow cylindrical element 12.

A first section S1 of a first end of the cylindrical element 11 is in contact with a first section S2 of a first end facing the second cylindrical element 12.

The shaft 10 further comprises threaded elements 13 and a closing piece 14.

The closing piece 14 is embedded in a second end 11b of the first cylindrical element 11 and comprises smooth holes 15 and a central recess 16 allowing the passage of wiring.

A first end of the threaded elements 13 is fixed in the first end 12a of the second cylindrical element 12, and a second end of the threaded elements 13 is fixed in the closing piece 14, such that the first section S1 of the first end 11a of the first cylindrical element 11 and the first section S2 of the first end 12a of the second cylindrical element 12 are held in contact with each other.

The first element 11 comprises a hollow tube configured to accommodate, on its external perimeter, rotor windings (not shown).

The second element 12 comprises a hollow tube comprising perforated through holes 17 and through holes 18 each comprising a counterbore.

Figure 5:
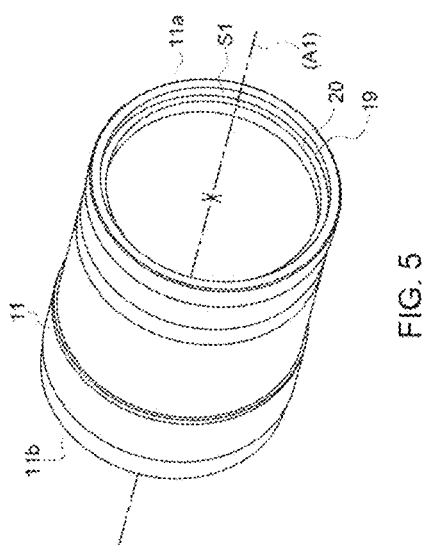
FIGS. 5 and 6 show an embodiment of a first hollow cylindrical element.
Figure 6:
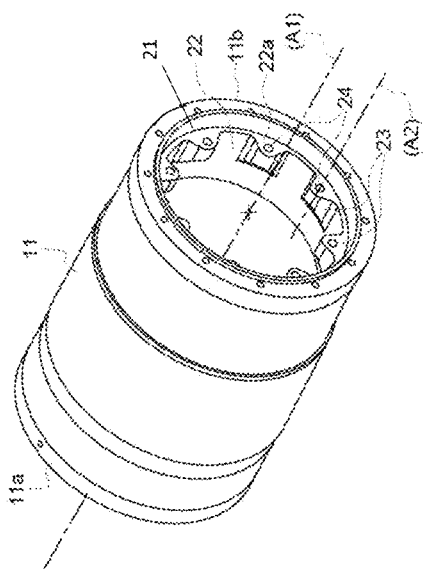

FIGS. 5 and 6 show an embodiment of the first hollow cylindrical element 11.

The first cylindrical element 11 comprises an axis of revolution (A1), the first end 11a, and the second end 11b.

The first end 11a comprises a first smooth ring 19 comprising a section merged with the first section S1 followed by a first shoulder 20 adapted to accommodate the first end 12a of the second cylindrical element 12.

The second end 11b comprises a second smooth ring 21 comprising a free section followed by a first ring of bosses 22. The bosses 23 incorporated into the first ring of bosses 22 are distributed regularly over an internal periphery of the second end 11b of the element 11 and each comprise a smooth guide hole 24 configured to guide the threaded elements 13.

The first ring of bosses 22 comprises a section 22a intended to be in contact with the closing piece 14.

The bosses 23 are configured such that the section 23a of the first ring of bosses 22 is sufficiently large to hold the closing piece 14 in abutment, and such that the bosses 23 are sufficiently rigid to hold the first sections S1 and S2 in contact with each other when the closing piece 14 is embedded in the second smooth ring 21 and the threaded elements 13 are fixed in the first end 12a of the second cylindrical element 12 and cooperate with the closing piece 14 such that the threaded elements are immobilized in the piece 14.

Each hole 24 is directed along a second axis parallel to the axis of revolution (A1) of the first element 11, for example along a second axis (A2) parallel to the axis (A1).

Figure 7:
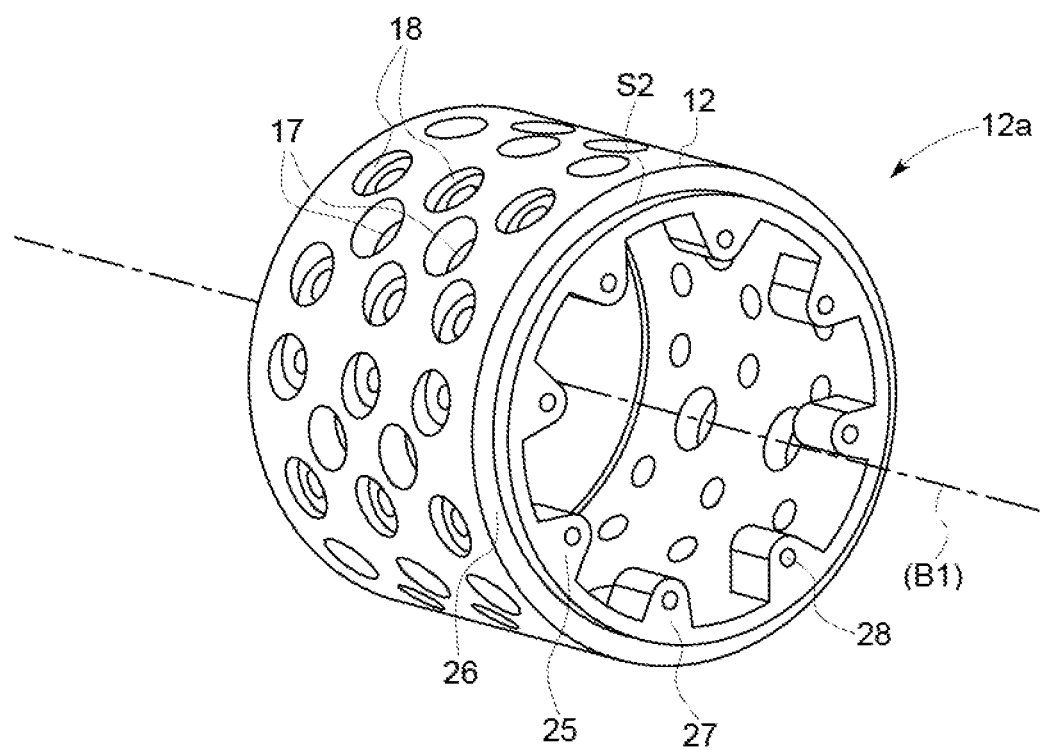
FIG. 7 shows an embodiment of a second hollow cylindrical element.

FIG. 7 shows an embodiment of the hollow cylindrical element 12.

The cylindrical element 12 comprises an axis of revolution (B1), the first end 12a, the perforated through holes 17 and the through holes 18 each comprising a counterbore.

The end 12a comprises a second ring of bosses 25 comprising a free section followed by a second shoulder 26 merged with the first section S2 of the element 12.

The second ring of bosses 25 comprises bosses 27 each comprising a thread 28 cooperating with the threaded elements 13.

Each thread 28 is directed along a thread axis parallel to the axis (B1).

The bosses 27 are distributed regularly over an internal periphery of the first end of the element 12 such as to form the second ring of bosses 25.

The first and second ring of bosses 22 and 25 of the cylindrical elements 11 and 12 comprise the same number of bosses arranged such that, when the first sections S1 and S2 of the elements 11 and 12 are in contact, the axes of the holes 24 and threads 28 are merged.

The first and second elements 11 and 12 are secured by securing means comprising the threaded elements 13, the closing piece 14 and the threads 28 in the second ring of bosses 25.

The threaded element 13 comprises, for example, a screw or a threaded rod and a nut as shown here.

The threaded element 13 is configured such that its first end is screwed into the thread 28 and its second end cooperates with the closing piece 14, such that, when the sections of the elements 11 and 12 are in contact with each other, the threaded element 13 is parallel to an axis (R) of revolution of the shaft and holds the two sections S1 and S2 of the first ends 11a and 12a in contact with each other.

The first smooth ring 19, the first and second shoulders 20 and 26 and the second ring of bosses 25 are incorporated into guide means.

An internal diameter of the first smooth ring 19, an external diameter of the second ring of bosses 25 and the first and second shoulders 20 and 26 are configured such that the internal surface of the first smooth ring 19 is in contact with the internal surface of the second ring of bosses 25 and the surface of a first shoulder 20 and the surface of a second shoulder 26 are in contact with each other.

Figure 8:
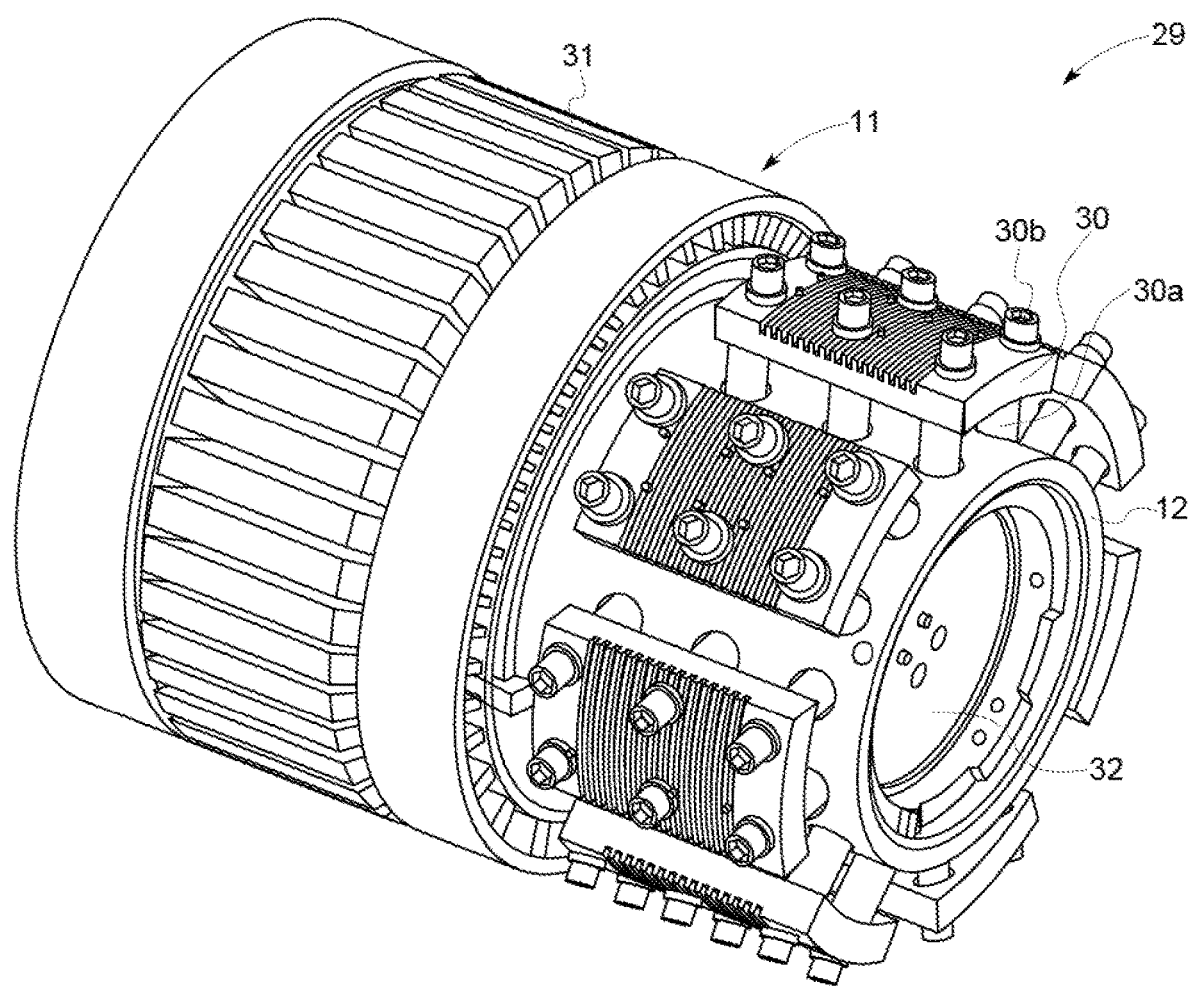
FIG. 8 shows an embodiment of a rotor.
Figure 9:
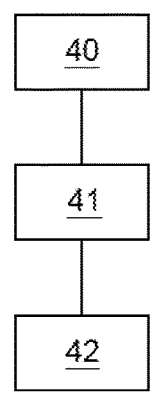
FIG. 9 describes a method of producing a rotor shaft.

FIG. 8 shows schematically an embodiment of a rotor 29 comprising the elements 11 and 12, diode plates 30, rotor windings 31 and a fixation part 32 for the diode plates 30.

The fixation part 32 is inserted into the second cylindrical element 12 and comprises threads.

Each diode plate 30 is fixed on the element 12 by fixation means configured to hold the diode plate on the element 12.

The fixation means may, for example, comprise hollow spacers 30a and screws 30b.

A diode plate 30 is connected via the spacers to the element 12 and held by the screws 30b passing through the spacers and the holes 18 each comprising a counterbore and pressing the plate 30 on the spacers 20a.

The screws 30b are screwed into the threads of the fixation part 32 configured to accommodate the screws 30b.

The through holes 17 are arranged such that the diode plates 30 can be fixed on the element 12 and the mechanical rigidity of the shaft 10 is not compromised when a rotor comprising the shaft is in motion.

The perforated holes 17 reduce the weight of the shaft 10. Therefore, the dynamic response of a rotor incorporating the shaft 10 to a stator magnetic field is improved: the response time of the rotor to a magnetic request is reduced.

For example, for a rotor weighing 187.5 kg, the weight reduction is on the order of 75 kg.

The external diameter of the elements 11 and 12 may be the same as shown here, or may be different.

A rectifier comprises the hollow cylindrical element 12, the support part 21 and the diode plates 20.

The rectifier and an assembly comprising the element 11 and the rotor windings 31 may be pre-assembled independently of one another, i.e. the elements 11 and 12 are made independently, the windings are integrated into the element 11 and the diode bridges are fixed to the element 12 independently, for example on two separate production lines, thus facilitating the logistics and organization of the rotor production system.

The shaft 10 can e transported and handled in the disassembled state, i.e. when the rectifier R and the assembly comprising the element 11 and the rotor windings are uncoupled.

In addition, since the electrical and mechanical characteristics of a rotating electrical machine incorporating the shaft 10, in particular the torque generated at the output of the shaft 2, depend on the surface of the windings distributed over the element 11, for a range of rotating electrical machines of the same shaft diameter 2, it is sufficient to modify the assembly comprising the element 11 and the rotor windings to modify the electrical and mechanical characteristics of the range of machines. The rectifier R is identical for each of the machines comprising the range. The shaft 10 is modular and requires only the adaptation of the assembly comprising the element 11 and the rotor windings to modify the electrical and mechanical characteristics.

FIG. 7 shows an example of a method for obtaining the shaft 10.

In a step 40, the first section S1 of the first element 11 and the first section S2 of the second element 12 are brought into contact.

During a step 41, the internal surface of the first smooth ring 19 is brought into contact with the internal surface of the second ring of bosses 25, and the surface of the first shoulder 20 is brought into contact with the surface of the second shoulder 26.

Then, in a step 42, the closing piece 14 is inserted into the second end 11b of the element 11 and the threaded elements 13 are inserted and locked in the holes 15 of the piece 14, pass through the smooth guide holes 24 and are screwed into the threads 28.

Each threaded element 13 passes through a hole 15 of the closing piece 14, a guide hole 24 and a different thread 28, such that each threaded element is parallel to an axis (R) of revolution of the shaft 10 and hold the first two sections (S1, S2) of the first and second hollow cylindrical elements (11, 12) in contact with each other.

Although the hollow rotor shaft 10 is configured to be incorporated into a rotating electrical machine, a rotor shaft for a rotating electrical machine may comprise cylindrical elements secured by the securing means and guide means as described above.

What We claim is:

1. A hollow rotor shaft for a rotating electrical machine comprising:
    a first part comprising:
    a first hollow cylindrical element comprising a first end having a first section and a second end having a closing piece embedded therein, the closing piece comprising a plurality of holes; and
    a second part comprising:
    a second hollow cylindrical element comprising a first end having a first section;
    wherein the first section of the first end of the first hollow cylindrical element is in direct contact with the first section of the first end of the second hollow cylindrical element, the sections being secured by a securing device; and
    wherein the securing device comprises a plurality of threaded elements and a plurality of bosses, the plurality of bosses being regularly distributed over an internal periphery of the first end of the second hollow cylindrical element forming a ring of bosses, with each boss comprising a thread, and each threaded element having (i) a first end fixed to one of the threads of one of the bosses and (ii) a second end extending through, and being fixed to, a corresponding hole of the plurality of holes of the closing piece, such that the first sections of the first and second hollow cylindrical elements are held in contact.

2. The shaft according to claim 1, wherein the threaded elements each passing through a different thread and cooperating with the closing piece such that each threaded element is parallel to an axis of revolution of the shaft and hold the two sections of the first and second hollow cylindrical elements in contact.

3. The shaft according to claim 1, further comprising a guiding device configured to fit the hollow cylindrical elements together.

4. The shaft according to claim 3, wherein the guiding device comprises a smooth open crown ring comprising a section merged with the first section of the first hollow cylindrical element followed by a first shoulder and the ring of bosses followed by a second shoulder merged with the first section of the second hollow cylindrical element.

5. The shaft according to claim 1, wherein the first hollow cylindrical element comprises a hollow tube for accommodating rotor windings on its external perimeter.

6. The shaft according to claim 1, wherein the second hollow cylindrical element comprises a hollow tube comprising perforated holes, through holes and a fixation part configured to accommodate a fixation device, the fixation device being configured to hold diode plates on the second hollow cylindrical element.

7. A rotor for a rotating an electrical machine comprising the hollow rotor shaft according to claim 1.

8. A method for obtaining a hollow rotor shaft for a rotating electrical machine comprising a first part and a second part, the first part comprising a first hollow cylindrical element comprising a first end having a first section, and a second end having a closing piece embedded therein, the closing piece comprising a plurality of holes, and the second part comprising a second hollow cylindrical element comprising a first end having a first section;
    wherein the first section of the first end of the first hollow cylindrical element is brought into direct contact with the first section of the first end of the second hollow cylindrical element via a plurality of threaded elements, each threaded element having (i) a first end fixed to a plurality of bosses being regularly distributed over an internal periphery of the first end of the second hollow cylindrical element forming a ring of bosses, with each boss including threads, and (ii) a second end extending through, and being fixed to, a corresponding hole of the plurality of holes of fixed to the closing piece, such that the first sections of the first and second hollow cylindrical elements are held in contact.

9. The method according to claim 8, wherein an internal surface of a smooth ring incorporated into the first end of the first cylindrical hollow element is brought into contact with an internal surface of the ring of bosses incorporated into the first end of the second cylindrical hollow element.

10. The method according to claim 8, wherein the first hollow cylindrical element further comprises a plurality of smooth guiding holes configured to guide the threaded elements with the second hollow cylindrical element; and wherein, the second hollow cylindrical element comprises the ring of bosses and threads configured to cooperate with the threaded elements by inserting the threaded elements, each passing through a different thread and a smooth guide hole such that each threaded element is parallel to an axis of revolution of the shaft and hold the first two sections of the first and second hollow cylindrical elements in contact with each other.

\* \* \* \* \*